United States Patent [19]

Albizzati et al.

[11] Patent Number: 4,904,628
[45] Date of Patent: * Feb. 27, 1990

[54] COMPONENTS AND CATALYSTS FOR THE POLYMERIZATION OF OLEFINS

[75] Inventors: Enrico Albizzati, Arona; Sandro Parodi, Oleggio; Pier C. Barbé, Ferrara, all of Italy

[73] Assignees: Montedison S.p.A., Milan, Italy; Mitsui Petrochemical Ind., Tokyo, Japan

[*] Notice: The portion of the term of this patent subsequent to Jun. 11, 2002 has been disclaimed.

[21] Appl. No.: 149,894

[22] Filed: Jan. 28, 1988

Related U.S. Application Data

[63] Continuation of Ser. No. 13,148, Feb. 10, 1987, abandoned, which is a continuation of Ser. No. 855,374, Apr. 24, 1986, abandoned, which is a continuation of Ser. No. 729,124, May 1, 1985, abandoned, which is a continuation of Ser. No. 465,594, Feb. 10, 1983, Pat. No.

[30] Foreign Application Priority Data

Feb. 12, 1982 [IT] Italy ................................ 19624 A/82

[51] Int. Cl.$^4$ ................................................ C08F 4/64
[52] U.S. Cl. ..................................... 502/121; 502/125; 502/126; 502/127
[58] Field of Search ............... 502/119, 121, 122, 123, 502/124, 125, 126, 127

[56] References Cited

U.S. PATENT DOCUMENTS

| | | | |
|---|---|---|---|
| 4,156,063 | 5/1979 | Giannini et al. | 502/127 X |
| 4,226,741 | 10/1980 | Luciani et al. | 502/125 X |
| 4,294,721 | 10/1981 | Cecchin et al. | 502/127 X |
| 4,315,836 | 2/1982 | Albizzati et al. | 502/124 X |
| 4,331,561 | 5/1982 | Luciani et al. | 502/125 |
| 4,522,930 | 6/1985 | Albizzati et al. | 502/119 X |

Primary Examiner—Patrick P. Garvin
Attorney, Agent, or Firm—Stevens, Davis, Miller & Mosher

[57] ABSTRACT

Catalysts for the polymerization of alpha-olefins, which comprise the product of the reaction between:

(a) a metallorganic compound of Al;
(b) an electron-donor compound reactive towards $MgCl_2$ but which is not completely complexed with $AlEt_3$, at the equivalent point of a potentiometric titration under standard conditions;
(c) a solid comprising a halogenated Ti compound and an electron-donor belonging to particular classes of compounds and being extractable with $AlEt_3$ for at least 70% by mols from the solid, the surface area of which after extraction is higher than 20 m$^2$/g.

The present invention refers to new supported components of catalysts for the polymerization of olefins $CH_2$=CHR, in which R is an alkyl with 1-4 carbon atoms or an aryl, and of mixtures of such olefins with each other and/or with ethylene, and to the catalysts obtained from such components.

3 Claims, No Drawings

COMPONENTS AND CATALYSTS FOR THE POLYMERIZATION OF OLEFINS

This application is a continuation of application Ser. No. 013,148, filed Feb. 10, 1987, which in turn is a Continuation of application Ser. No. 855,374, filed Apr. 24, 1986, which in turn is a continuation of application Ser. No. 729,124, filed May 1, 1985, all three now abandoned, which in turn is a Continuation of application Ser. No. 465,594, filed Feb. 10, 1983 now U.S. Pat. No. 4,522,930.

BACKGROUND OF THE INVENTION

Catalysts endowed with high activity and high stereospecificity, obtained from metalorganic Al compounds, silicon compounds containing Si—O—C, Si—OCOR or Si—NR$_2$ bonds and from a solid comprising a halogenated titanium compound and an electron-donor compound, both supported on an active Mg halide have been disclosed, the electron-donor compound being selected from specific classes of ester.

THE PRESENT INVENTION

We have now found, unexpectedly, that it is possible to prepare highly active and highly stereospecific catalysts also by employing electron-donor compounds different from those described in the earlier patent applications, provided that the employed electron-donor compound belonds to certain classes of compounds, as specified hereinafter, and is for at least 70% by mols extractable from the solid catalyst component by reaction under standard conditions with Al-triethyl, and that the surface area of the product after extraction is not less than 20 m$^2$/g.

The catalysts of the invention comprise the product of the reaction between at least the following components:

(a) an Al-alkyl compound, preferably an Al-trialkyl or a compound containing two or more Al atoms linked to each other through oxygen or nitrogen atoms or through SO$_4$ or SO$_3$ groups;

(b) an electron-donor compound (or Lewis base) which, under the standard conditions of measurement as indicated hereinafter, is reactive towards MgCl$_2$ but which results not to be completely complexed with AlEt$_3$ at the equivalent point of a potentiometric titration under standard conditions;

(c) a solid comprising a Ti halide and an electron-donor compound both supported on a Mg halide, such an electron-donor compound being selected from the classes of: ethers, ketones, lactones, electron-donor compounds containing N, P and/or S atoms, and from the following esters:

(1) hydrocarbyl esters of linear saturated dicarboxylic acids containing from 2 to 5 C atoms;

(2) esters of unsaturated polycarboxylic acids, in which two carboxyl groups are linked to vicinal, double bond-forming carbon atoms and in which the hydrocarbyl radical or radicals of the COOR groups are linear saturated or unsaturated radicals or cycloaliphatic radicals with 1-20 C atoms or hydrocarbyl esters of unsaturated linear or branched polycarboxylic acids with 1-20 carbon atoms, in which the carboxy groups are not linked to vicinal double bond-forming carbon atoms;

(3) hydrocarbyl esters of aromatic meta- and paradicarboxylic acids and hydrocarbyl esters of aromatic polycarboxylic acids containing more than two carboxyl groups;

(4) hydrocarbyl esters of aromatic hydroxy compounds containing the OH groups in meta- or para-position, and esters of aromatic hydroxy acids the OH groups of which are in meta- or para-position with respect to the carboxyl group;

(5) esters RCOOR' the hydrocarbyl groups R and R' of which can be the same or different, and which are linear saturated or unsaturated radicals or cycloaliphatic radicals having from 1 to 20 carbon atoms, or R is an aryl, alkylaryl or cycloalkyl with 5–20 carbon atoms and R' is a hydrocarbyl radical or a heterocyclic ring with 5–7 atoms in the ring;

(6) hydrocarbyl esters of polycarboxylic acids in which at least one carboxyl group is linked to an aromatic ring and at least one other is linked to a carbon atom of an aliphatic group or to a cycloaliphatic ring or at least two carboxyl groups are linked to an aromatic ring through an alkylene group;

(7) esters of aromatic polycarboxylic acids containing at least two non-condensed aromatic rings, each bearing a carboxyl group;

(8) esters of carbonic acid with glycols and carbonic acid derivatives of formula RO—CO—OR' wherein R and R' are the same or different acyl groups with 1–20 carbon atoms;

(9) esters of polyols and monohydroxy-phenols; and

(10) hydrocarbyl esters of acetylenic acids; the electron-donor compound being extractable from the solid for at least 70% by mols with Al-triethyl under standard measurement conditions, and the surface area of the solid subjected to extraction being higher than 20 m$^2$/g.

Examples of electron-donor compounds belonging to the above specified classes and suitable for the preparation of the catalyst components of the invention are: diisoamyl ether, diisobutyl ether, benzophenone, triphenyl phosphite, phenyl propionate, di-n-butyl succinate, diisobutyl succinate, di-n-butyl malonate, diethyl allylmalonate, di-n-butyl maleate, ethyl and propyl trichloroacetate, POCl$_3$, triphenylphosphine, α-methyl-α-phenyl-butyrolactone, 1,6-hexandiol di-p-toluate, 1,4-butandiol di-p-toluate, ethyl benzoyl carbonate (C$_6$H$_5$CO—O—CO—OC$_2$H$_5$), diisobutyl ester of ophenylene diacetic acid.

It is understood that the above classes of esters include also the derivatives thereof as, for instance, the derivatives containing halogen atoms or unsaturated hydrocarbyl radicals. Ethyl trichloroacetate and diethylallyl malonate listed above are examples of such derivatives.

All the above compounds are extractable from the solid catalyst component for at least 70% by mols by reaction with Al-triethyl. The surface area of the solid after the treatment with Al-triethyl is higher than 20 m$^2$/g and in the case of very active catalysts higher than 100 m$^2$/g and in general comprised between 100 and 300 m$^2$/g.

In the case of weak electron-donors, as certain ethers, it has been found that the ether can be substantially removed from the catalytic solid during the preparation if the latter comprises treatments with excess TiCl$_4$ and/or washings with halogenated solvents. Nevertheless, also these catalyst components fall within the scope of the present invention. It is understood that the above donor compounds, when subjected to the extractability test with Al-triethyl before the above mentioned treatments, comply with the test.

It has also been found that it is possible to obtain catalyst components according to the invention also by employing certain electron-donor compounds, such as alkyl, cycloalkyl or aryl esters of aromatic monocarboxylic acids, which in the preparation conditions hitherto known do not from catalyst components satisfying the requirements of this invention.

The components according to the invention are prepared by methods which consist in hot washing with a halogenated hydrocarbon solvent a co-ground mixture comprising the ester, the Ti compound and the Mg halide.

By Ti halides and electron-donor compounds supported on a Mg dihalide are meant the compounds non-extractable from component (c) after treatment with boiling 1,2-dichloroethane for 2 hours (concentration of the solid in the suspension: 5% by weight).

The compounds reactive towards $MgCl_2$ are those which under the standard conditions of the reaction remain fixed on the Mg halide for at least 20% by mols.

Components (a), (b) and (c) are reacted with each other in any order; nevertheless, components (a) and (b) are preferably pre-mixed before being contacted with component (c).

Components (c) can be pre-mixed with component (a) and/or with component (b). The pre-mixing of (a) and (b) is carried out at temperatures usually comprised between room temperature and the temperature employed in the polymerization.

The pre-reaction of (c) and (b) can be carried out also at higher temperatures. Compound (b) can also be incorporated in and reacted with component (c) itself.

Component (b) is reacted in a molar ratio with respect to the halogenated Ti compound supported on component (c) of at least 1, and in a molar ratio with respect to the Al-alkyl compound employed as component (a) lower than 20 and preferably comprised between 0.05 and 1. Ratios higher than 1 can be employed with compounds (b) not complexing or only weakly complexing Al-triethyl also under conditions promoting such complex formation.

In component (c) the molar ratio between the Mg dihalide and the halogenated Ti compound supported on it is comprised between 1 and 500, and the molar ratio between the halogenated Ti compound and the electron-donor both supported on the Mg dihalide is comprised between 0.1 and 50.

The electron-donor compounds as defined in (b) does not show at the equivalent point of the titration test with Al-triethyl (carried out under the standard conditions indicated hereinafter) any logarithmic variation of potential i.e., a wave, in the titration curve.

A completely different situation occurs in the case of amines like isoquinoline or esters like ethyl-p-toluate or ethylbenzoate, wherein the titration curve shows a wave at the equivalent point. The absence of a wave at the equivalent point indicates that electron-donor compound (b) is present, at least in part, in non-complexed form with Al-triethyl.

Electron-donor compounds containing active hydrogen atoms reactive towards Al-triethyl, i.e., capable of substitution reactions with Al-triethyl, are prereacted with Al-triethyl before subjecting the same to the complexion test. In the titration test the equivalent point is generally referred to the use of 1 mol of Al-triethyl per mol of donor.

Compounds (b) can be used in mixture, in a wide range, with donors forming complexes with Al-triethyl when titrated according to the test set forth above.

The titration of the mixtures containing significant amounts of the complexing donors, shows the potential variation due to the presence of said complexing donors.

However, the polymerization performance of the catalysts obtained by using the above mixtures as component (b) is not significantly reduced by the presence of the complexing donor.

The compound (b) is selected in particular from compounds of general formula:

wherein:
R is an alkyl, alkenyl, aryl, arylalkyl or cycloalkyl radical with 1-20 carbon atoms;
Y is a —OR', —OCOR' or —NR'$_2$ radical in which R', the same as or different from R, has the same meaning as R;
X is a halogen or hydrogen atom or a —OCOR" or —NR"$_2$ group in which R", the same as or different from R', has the same meaning as R'; m, n, p are numbers comprised:
m from 0 to 3, n from 1 to 4 and p from 0 to 1; m+n+p is equal to 4.

Preferred silicon compounds are: phenyl alkoxy silanes such as phenyl triethoxy or phenyl trimethoxy silane, diphenyl dimethoxy and diphenyl diethoxysilane, monochlorophenyl diethoxy silane; alkyl alkoxy silanes such as ethyl triethoxy silane, ethyl triisopropoxy silane.

In the catalysts according to the invention, the silicon compound is present in combined form in the solid product of the reaction between the various components forming the catalyst in a molar ratio between the silicon compound and the halogenated Ti compound higher than 0.05 and in general comprised between 0.1 and 5.

Other suitable compounds (b) are: 2,2,6,6-tetramethylpiperidine, 2,2,5,5-tetramethylpyrrolidine, 2,2,6,6-tetramethylpiperidide-Al-diethyl, Al-dichloro-monophenoxy.

The Al-alkyl compounds of component (a) include the Al-trialkyls, such as for instance $AlEt_3$, $Al(i-C_3H_7)_3$, $AlEt_2H$, and compounds containing two or more Al atoms linked to each other through hetero-atoms, such as:

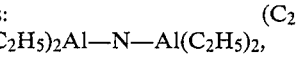

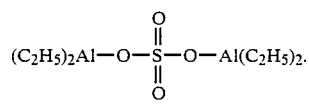

As indicated, Al-alkyl compounds in which Al atoms are linked through groups like $SO_4$ or $SO_3$ are also suitable.

The Al-alkyl compounds can be employed in admixture with Al-alkyl halides, as $AlEt_2Cl$.

Component (c) is prepared according to various methods. One of these consists in co-grinding the Mg halide and the electron-donor compound until the product, after extraction with Al-triethyl under standard conditions, shows a surface area higher than 20 $m^2/g$, and in reacting subsequently the ground product with the Ti compound.

Preparations of this type are described in British Patent No. 1,559,194.

Another method consists in reacting adduct Mg halide/alcohol with a Ti compound in the presence of the electron-donor compound. This method is described in Belgian Patent No. 868,682.

According to another method, described in published German patent application No. 3,022,738, the adduct Mg dihalide/alcohol is reacted in liquid form with the halogenated Ti compound and with the electron-donor compound.

Other methods are described in published German patent application No. 2,924,029, U.S. Pat. No. 4,220,554 and Italian patent application No. 27261/79.

Another method consists in co-grinding the Mg dihalide, the halogenated Ti compound and the electron-donor compound until the Mg dihalide is activated, in treating a suspension of the ground product in a halogenated hydrocarbon, as 1,2-dichloroethane, chlorobenzene, methylene dichloride, or hexachloroethane, and in separating the solid from the liquid halogenated hydrogenated. This method is particularly suitable for preparing catalyst components satisfying the extractability criterion of the present invention when esters of aromatic monocarboxylic acids, such as, for instance, alkyl esters of benzoic acid, are used as electron-donor compounds.

The treatment is carried out at temperatures comprised between 40° C. and the boiling point of the halogenated hydrocarbon for a time ranging in general from 1 to 4 hours.

According to another method, a porous carrier such as $SiO_2$ or $Al_2O_3$ having a low content of OH groups (preferably less than 1% by weight) is impregnated with a liquid adduct Mg dihalide/alcohol; then the carrier is treated with an excess of $TiCl_4$ containing in solution the electron-donor compound according to the procedure described, for example, in German Patent Application No. 3,022,738 or in Belgian Patent No. 868,682.

In all the above methods the final product contains a Mg dihalide in the active form as defined hereinafter. By "active form of the Mg dihalide" is meant the Mg dihalides showing, in the X-raus powder spectrum of component (c), a broadening of at least 30% of the most intense diffraction line appearing in the powder spectrum of the corresponding dihalide having a surface area of 1 $m^2$/g, or is meant the Mg dihalides showing an X-rays spectrum in which said most intense diffraction line is replaced by a halo with its intensity peak shifted with respect to the interplanar distance of the most intense line.

Very active forms of Mg dihalides are those showing an X-rays powder spectrum in which the most intense diffraction line appearing in the spectrum of the corresponding halide having a surface area of 1 $m^2$/g has a decreased intensity and is broadened to form a halo, or are those in which said most intense line is replaced by a halo having its intensity peak shifted with respect to the interplanar distance of the most intense line.

In general, the surface area of the above forms is higher than 30–40 $m^2$/g and in particular is comprised between 100 and 300 $m^2$/g.

Preferred Mg dihalides are $MgCl_2$ and $MgBr_2$. The water content of the dihalides in general is lower than 1% by weight.

Other known methods for preparing a Mg dihalide in active form or catalyst components containing Ti and supported on a Mg dihalide, in which components the Mg dihalide is present in active form, are based on the following reactions:

reaction of a Grignard compound or of a compound $MgR_2$ (R is hydrocarbyl) or of complexes $MgR_2$/Al-trialkyls with halogenating agents, as $AlX_3$ or compounds AlRmXn (X is halogen, R is hydrocarbyl, m+n=3), $SiCl_4$ or $HSiCl_3$;

reaction of a Grignard compound with a silanol or a polysiloxane, $H_2O$ or with an alcohol and subsequent reaction with a halogenating agent or with $TiCl_4$;

reaction of Mg with an alcohol and with a hydrogen halide, or of Mg with a hydrocarbyl halide and with an alcohol;

reaction of MgO with $Cl_2$ or $AlCl_3$;

reaction of $MgX_2.nH_2O$ (X is halogen) with a halogenating agent or with $TiCl_4$;

reaction of Mg mono- or dialcoholates or of Mg carboxylates with a halogenating agent.

Suitable titanium halides and halogen-alcoholates are, in particular, the Ti tetrahalides, the Ti trihalides and the Ti trihalogen-alcoholates. Preferred compounds are: $TiCl_4$, $TiBr_4$, 2,6-dimethylphenoxytrichlorotitanium and trichlorophenoxy-titanium.

The Ti trihalides are obtained by known methods, for instance by reduction of $TiCl_4$ with Al or with a metal-organic compound of Al or with hydrogen.

In the case of the Ti trihalides it can be expedient to improve the performance of the catalysts, to carry out an oxidation, even partial, of the titanium during or after the preparation of component (c). To this end, halogens and iodine halides can be employed.

Preferred catalysts are those in which component (c) is obtained from $MgCl_2$, $TiCl_4$ or $Cl_3TiOC_6H_5$ and esters of maleic or malonic acid or from diisoamyl ether or benzophenone, and in which component (b) is phenyl- or ethyl-triethoxy-silane or diphenyl-dimethoxy-silane or diphenyl-diethoxy-silane.

Component (a) is an Al-trialkyl, as Al-triethyl or Al-triisobutyl.

The preferred methods for the preparation of component (c) are those described in British Patent No. 1,559,194, Belgian Patent No. 868,682, published German Patent Applicaton No. 2,924,029, U.S. Pat. No. 4,220,554, U.S. Pat. No. 4,328,122 or published German Patent Application No. 3,022,738.

Among the preferred methods for preparing component (c) there is also the co-grinding of $MgCl_2$, $TiCl_4$ and electron-donor and the treatment of the ground product with a halogenated hydrocarbon, as 1,2-dichloroethane.

The catalysts according to the invention are employed to polymerize alpha-olefins by known methods, that is by carrying out the polymerization in liquid phase, either in the presence or in the absence of an inert hydrocarbon solvent, or in gas phase or also by combining, for instance, a polymerization step in liquid phase with a step in gas phase.

In general, the temperature is comprised between 40° and 160° C., but preferably between 60° and 90° C., operating either at atmospheric pressure or at higher pressure.

As a molecular weight regulator can be employed hydrogen or another regulator of known type.

The catalysts are particularly suitable for the polymerization of propylene, butene-1, styrene and 4-methyl-pentene-1. The catalysts can also be employed for polymerizing, by known methods, mixtures of propylene and ethylene to produce modified polypropylene having improved impact resistance at low temperatures (the so-called propylene/ethylene block copolymers) or to obtain crystalline random copolymers of propylene with minor proportions of ethylene.

The test for the determination of the complexability of compound (b) is carried out by using a potentiograph Metrohm model E 536 equipped with titration bench E 535, automatic burette E 552, magnetic stirrer E 549 and titration cell EA 880. A combined electrode EA 281 (Pt/Ag/AgCl/KCl 3M) is employed.

As titrating agent is employed a 0.5M hexane solution of Al-triethyl which is added to a 0.5M benzene solution of the compound under examination. It is operated at room temperature under nitrogen atmosphere. The test of reactivity of the electron-donor compound with $MgCl_2$ is carried out under the following conditions:

Into a flask of 500 cc capacity are introduced, under nitrogen atmosphere, 2 g $MgCl_2$ (21 mMoles) suspended in 200 cc toluene and 3.5 mMoles of the electron-donor under examination. It is allowed to react at 25° C. for 1 hour and the solid is filtered and washed with 200 cc toluene and then with 200 cc n-heptane. The solid is isolated, dried and analyzed.

As $MgCl_2$ is employed the product obtained from $MgCl_2.2.5C_2H_5OH$ by reaction with Al-triethyl according to the following procedure: into a 3000 cc flask are introduced 2340 cc of a 0.83M hexane solution of $Al(C_2H_5)_3$; while maintaining the temperature below 10° C., 136 g $MgCl_2.2.5C_2H_5OH$ are added little by little. After the addition is completed, it is heated at 70° C. for 4 hours; then the solid is filtered, washed repeatedly with n-heptane and dried under a vacuum of 0.2–0.5 Torr.

The surface area of the obtained $MgCl_2$ amounts to 618 $m^2/g$ and the pores volume to 0.532 cc/g.

The following non-limiting examples are given to illustrate the invention in even more detail.

EXAMPLES 1–16 AND COMPARATIVE EXAMPLES 1–4

Preparation of the Solid Catalyst Component

Into a vibrating mill having a total volume of 1 liter and containing 3 kg steel balls of 16 mm diameter were introduced, under nitrogen atmosphere, 50 g anhydrous $MgCl_2$, an electron-donor compound in such amount as to have a molar ratio $MgCl_2$ monofunctional electron-donor equal to 6 and a molar ratio $MgCl_2$/bifunctional electron-donor equal to 12, and $TiCl_4$ in the molar ratio 1/1 with respect to the electron-donor compound. The whole was ground for 72 hours.

10 g of the co-ground product were treated with 100 cc 1,2-dichloroethane for 2 hours at 80° C.; it was filtered at the same temperature and after several washings with n-heptane the solid catalyst component was suspended in heptane.

Polymerization

Into a stainless steel autoclave of 3000 cc holding capacity, equipped with magnetic anchor stirrer and thermometer, heat stabilized at 60° C., and into which propylene was made to flow, was introduced a suspension consisting of 1000 cc anhydrous and deaerated n-heptane, 5 millimoles aluminum triethyl, the desired amount of the silicon compound and the solid catalyst component.

Hydrogen was then introduced at a pressure of 0.2 atmospheres and the mass was heated rapidly at 70° C. while simultaneously feeding in propylene up to a total pressure of 7 atmospheres.

Solid pressure was kept constant over the whole polymerization time by feeding in the monomer continuously. After 4 hours the polymerization was stopped and the polymer was isolated by filtration and dried. The quantity of polymer dissolved in the filtrate was isolated, weighed and summed to the polymer soluble in boiling n-heptane for the calculation of the isotacticity index (I.I.).

The results of the polymerization runs are reported in the Table.

In the Table are also reported the results of the tests of extractability with Al-triethyl. The tests were carried out under the following standard conditions:

Into a 5 liter flask are introduced 4 liters of anhydrous and deaerated n-heptane containing 20 m Moles $Al(C_2H_5)_3$. The temperature is raised to 70° C., about 1 g of solid catalyst component is introduced and the whole is allowed to react under stirring for 15 minutes. Thereupon it is cooled rapidly at 0° C. and is filtered, thus isolating a solid which is dried under vacuum at 25° C. and analyzed.

TABLE

| | SOLID CATALYST COMPONENT | | | |
|---|---|---|---|---|
| | Electron-donor (ED) | | Extraction with $Al(C_2H_5)_3$ | |
| Example No. | Type | % by weight (1) | % by weight (3) | Surface area ($M^2/g$) |
| 1 | Di-n-butyl maleate | 6.2 | 0 | 186 |
| 2 | Di-n-butyl itaconate | | | |
| 3 | Diethyl allylmalonate | | | |
| 4 | Di-n-butyl malonate | | | |
| 5 | Diisobutyl succinate | | | |
| 6 | Di-n-butyl succinate | | | |
| 7 | Benzophenone | | | |
| 8 | Ethyl trichloroacetate | 9.2 | 0.54 | 186 |
| 9 | Ethyl benzoate | 8.8 | 0.8 | 163 |
| 10 | Diisoamyl ether (2) | 1 | 0 | 163 |
| 11 | α-Methyl-α-phenyl-γ-butyrolacetone | 7.3 | 0.9 | 90 |
| 12 | $POCl_3$ | | | |
| 13 | Triphenylphosphine | | | |
| 14 | Ethyl acetate | 4.2 | 0 | 229 |
| 15 | $C_6H_5-\overset{O}{\underset{\|}{C}}-O-\overset{O}{\underset{\|}{C}}-OC_2H_5$ | 9.4 | 0.3 | 174 |

TABLE-continued

| | | | | |
|---|---|---|---|---|
| 16 | Diisobutyl o.phenylene diacetate | 6.7 | 0.9 | 165 |
| 1 compar. | 2-Ethylhexyl terephtalate | 9.2 | 0.26 | 1 |
| 2 compar. | Phenothiazine | 7.7 | 3.6 | |
| 3 compar. | Diisobutyl O,O—diphenyldicarboxylate | 6.6 | 2.4 | |
| 4 compar. | Isobutyl m-acetoxybenzoate | 8.8 | 4.2 | |

POLYMERIZATION

| Example No. | Silicon compound | Al/Si molar ratio | Yield g PP/g catalyst component | I.I. (%) | $\eta$ inh (dl/g) |
|---|---|---|---|---|---|
| 1 | $(C_6H_5)_2Si(OCH_3)_2$ | 10 | 8600 | 95.1 | 1.5 |
| 2 | $(C_6H_5)_2Si(OCH_3)_2$ | 10 | 4600 | 93.6 | 1.4 |
| 3 | $(C_6H_5)_2Si(OCH_3)_2$ | 10 | 8500 | 97.3 | 1.6 |
| 4 | $(C_6H_5)_2Si(OCH_3)_2$ | 10 | 5000 | 91.2 | 1.3 |
| 5 | $(C_6H_5)_2Si(OCH_3)_2$ | 10 | 4000 | 90 | 1.2 |
| 6 | $(C_6H_5)_2Si(OCH_3)_2$ | 10 | 3600 | 91.5 | 1.3 |
| 7 | $(C_6H_5)_2Si(OCH_3)_2$ | 3.3 | 3600 | 93.8 | 1.2 |
| 8 | $(C_6H_5)Si(OC_2H_5)_3$ | 3.3 | 5600 | 92.2 | 1.1 |
| 9 | $(C_6H_5)Si(OC_2H_5)_3$ | 10 | 4500 | 95.5 | 1.1 |
| 10 | $(C_6H_5)Si(OC_2H_5)_3$ | 5 | 5200 | 91 | 1.3 |
| 11 | $(C_6H_5)Si(OC_2H_5)_3$ | 5 | 3600 | 91.8 | 1.2 |
| 12 | $(C_6H_5)Si(OC_2H_5)_3$ | 5 | 4000 | 92 | 1.5 |
| 13 | $(C_6H_5)Si(OC_2H_5)_3$ | 5 | 3600 | 90.5 | 1.2 |
| 14 | $(C_6H_5)Si(OC_2H_5)_3$ | 10 | 3200 | 96.6 | 1.2 |
| 15 | $(C_6H_5)Si(OC_2H_5)_3$ | 20 | 5500 | 91.3 | 1.5 |
| 16 | $(C_6H_5)Si(OC_2H_5)_3$ | 20 | 3500 | 90.7 | 1.2 |
| 1 compar. | $(C_6H_5)Si(OC_2H_5)_3$ | 10 | 2300 | 88 | 1.1 |
| 2 compar. | $(C_6H_5)Si(OC_2H_5)_3$ | 10 | 1300 | 71.8 | 1.2 |
| 3 compar. | $(C_6H_5)Si(OC_2H_5)_3$ | 10 | trace | — | — |
| 4 compar. | $(C_6H_5)Si(OC_2H_5)_3$ | 10 | 550 | 84.4 | 1.2 |

(1) The percent amount of ED is referred to the solid after washing with 1,2-dichloroethane.
(2) The diisoamyl ether content of the ground product, before washing with 1,2-dichloroethane, was 17%.
(3) The percent of ED remaining on the solid of the extraction with $Al(C_2H_5)_3$.

We claim:

1. A solid component to be employed, in combination with metallorganic Al compounds and with electron-donor compounds which are not completely complexed with Al-triethyl at the equivalent point of a potentiometric titration under standard conditions but reactive toward anhydrous Mg chloride, to form catalysts for the polymerization of alpha-olefins $CH_2=CHR$, said component comprising a titanium compound having at least a Ti-halogen bond and an electron-donor compound both supported on an anhydrous Mg dihalide, the electron-donor compound being selected from the group consisting of diisoamyl ether, triphenyl phosphite, α-methyl-α-phenyl-γ-butyrolactone and the following classes of esters:

(1) di-n-butyl succinate and di-isobutyl succinate;
    (2) esters of unsaturated polycarboxylic acids in which two carboxyl groups are linked to vicinal, double bond-forming carbon atoms and in which the hydrocarbyl radical or radicals of the COOR groups are linear saturated or unsaturated radicals or cycloaliphatic radicals with 2–20 carbon atoms or hydrocarbyl esters of unsaturated linear or branched polycarboxylic acids with 1–20 carbon atoms in which the carboxy groups are not linked to vicinal double bond-forming carbon atoms;
    (3) hydrocarbyl esters of aromatic meta- and paradicarboxylic acids and hydrocarbyl esters of polycarboxylic aromatic acids containing more than two carboxyl groups;
    (4) hydrocarbyl esters of aromatic hydroxy compounds containing the OH groups in meta- or para-position and esters of aromatic hydroxy acids the OH groups of which are in meta- or para-position with respect to the carboxyl group;
    (5) hydrocarbyl esters of polycarboxylic acids in which at least one carboxyl group is linked to an aromatic ring and at least one other is linked to carbon atom of an aliphatic chain or to a cycloaliphatic ring or at least two carbonyl groups are linked to an aromatic ring through an alkylene group;
    (6) esters of aromatic polycarboxylic acids containing at least two non-condensed aromatic rings, each bearing a carboxyl group;
    (7) esters of carbonic acid with glycols, and carbonic acid derivatives of formula RO—CO—OR' wherein R and R' are the same or different acyl groups with 1–20 carbon atoms;
    (8) esters of polyols and of monohydroxy-phenols; and
    (9) hydrocarbyl esters of acetylenic acids; the electron-donor compounds being extractable from the solid for at least 70% by mols with Al-triethyl under standard measurement conditions, and the surface area of the solid subjected to extraction being higher than 20 $m^2$/g.

2. A solid component according to claim 1, in which the Mg halide is $MgCl_2$.

3. A solid component according to claim 1, in which the Mg halide is $MgBr_2$.

* * * * *